(12) United States Patent
Liu et al.

(10) Patent No.: US 11,073,932 B2
(45) Date of Patent: *Jul. 27, 2021

(54) TOUCH DISPLAY PANEL AND DISPLAY DEVICE

(71) Applicant: SHANGHAI TIANMA MICRO-ELECTRONICS CO., LTD., Shanghai (CN)

(72) Inventors: Liang Liu, Shanghai (CN); Feng Lu, Shanghai (CN); Qijun Yao, Shanghai (CN); Shaolong Ma, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 2 days.

This patent is subject to a terminal disclaimer.

(21) Appl. No.: 15/785,385

(22) Filed: Oct. 16, 2017

(65) Prior Publication Data
US 2018/0039369 A1   Feb. 8, 2018

(30) Foreign Application Priority Data

Jun. 30, 2017   (CN) .......................... 201710522451.5

(51) Int. Cl.
*G06F 3/041*   (2006.01)
*G06F 3/045*   (2006.01)

(52) U.S. Cl.
CPC .......... *G06F 3/04142* (2019.05); *G06F 3/045* (2013.01)

(58) Field of Classification Search
CPC ...... G06F 3/0414; G06F 3/045; G06F 3/0478; G06F 2203/04105; G06F 3/041; G06F 3/0412; G06F 3/0416; G06F 3/044; G06F 3/0487; H03M 1/0609; H03M 1/10; H03M 1/462; G01K 7/16; G01D 3/0365
See application file for complete search history.

(56) References Cited

U.S. PATENT DOCUMENTS

| | | | |
|---|---|---|---|
| 9,726,935 B2 * | 8/2017 | Yim | G02F 1/1339 |
| 2004/0125321 A1 * | 7/2004 | Park | G02F 1/133516 349/156 |
| 2004/0156168 A1 * | 8/2004 | LeVasseur | G06F 3/0414 361/679.21 |
| 2015/0358027 A1 * | 12/2015 | Tanizawa | H03M 1/462 341/118 |
| 2015/0370376 A1 * | 12/2015 | Harley | G06F 3/0447 345/174 |
| 2016/0147353 A1 * | 5/2016 | Filiz | G01L 1/16 345/174 |

(Continued)

FOREIGN PATENT DOCUMENTS

| | | |
|---|---|---|
| CN | 105511679 A | 4/2016 |
| CN | 206133514 U | 4/2017 |

*Primary Examiner* — Ryan A Lubit
(74) *Attorney, Agent, or Firm* — Kilpatrick Townsend & Stockton, LLP

(57) ABSTRACT

A touch display panel and a display device are provided. The touch display panel includes a display area and a non-display area around the display area. The non-display area includes a plurality of pressure sensors. At least one of the plurality of pressure sensors is located a distance of H away from a closest corner of the touch display panel, where H satisfies: 2.5 mm<H<42.5 mm. The touch display panel and the display device are provided to improve the pressure detection of the touch display panel.

14 Claims, 18 Drawing Sheets

(56) References Cited

U.S. PATENT DOCUMENTS

| | | | |
|---|---|---|---|
| 2016/0272487 A1* | 9/2016 | Sato | B81C 1/00182 |
| 2017/0052397 A1* | 2/2017 | Kim | G02F 1/133707 |
| 2017/0199616 A1* | 7/2017 | Kim | G09G 3/3233 |
| 2017/0235168 A1* | 8/2017 | Song | G02F 1/1337 |
| | | | 349/123 |
| 2017/0242506 A1* | 8/2017 | Patel | G06F 3/041 |
| 2017/0262111 A1* | 9/2017 | Sang | G06F 3/0445 |
| 2017/0262121 A1* | 9/2017 | Kurasawa | G06F 3/0443 |
| 2017/0277296 A1* | 9/2017 | Reynolds | G06F 3/044 |
| 2018/0024694 A1* | 1/2018 | Kwon | G06F 3/0416 |
| | | | 345/175 |
| 2018/0107322 A1* | 4/2018 | Liu | G06F 3/04166 |
| 2018/0143725 A1* | 5/2018 | Nathan | G06F 3/0412 |
| 2018/0204885 A1* | 7/2018 | Chiang | H01L 27/323 |
| 2018/0217706 A1* | 8/2018 | Huang | H05K 1/189 |
| 2018/0329570 A1* | 11/2018 | Chan | G06F 3/04184 |

\* cited by examiner

TOUCH DISPLAY PANEL AND DISPLAY DEVICE

CROSS-REFERENCES TO RELATED APPLICATIONS

This application claims priority to Chinese patent application No. 201710522451.5, filed on Jun. 30, 2017, the disclosure of which is incorporated herein by reference in its entirety.

TECHNICAL FIELD

The present disclosure relates to display techniques and, in particular, to a touch display panel and a display device.

BACKGROUND

At present, a display panel with a touch function is widely used as an information input tool in a mobile phone, a tablet PC, an information inquiry machine in a public service hall or other display devices. Simply by touching icons on a touch display panel via a finger, a user can operate the electronic device, eliminating the user's dependence on other devices (e.g., a keyboard, a mouse, etc.) and facilitating a human-computer interaction.

To better meet user preferences, usually pressure sensor units are disposed in the touch display panel to detect touch pressure values when the user touches the touch display panel, so that not only touch position information but also touch pressure values of the touch display panel can be collected, thus enriching the application scope of touch display techniques.

The pressure sensor units detect touch pressure values by sensing stresses or strains in two directions. However, corners of the touch display panel are not prone to deformations and thus cannot be easily detected by the pressure sensor units of the touch display panel, causing pressure detection blind areas in the touch display panel.

SUMMARY

A touch display panel and a display device are provided to improve a pressure detection condition of the touch display panel.

In a first aspect, an embodiment of the present disclosure provides a touch display panel including a display area and a non-display area around the display area.

The non-display area includes a plurality of pressure sensors.

At least one of the plurality of pressure sensors is located a distance of H away from a corner of the touch display panel closest to the at least one of the plurality of pressure sensors, where H satisfies:

2.5 mm<H<42.5 mm.

In a second aspect, an embodiment of the present disclosure provides a touch display device including the touch display panel described in the first aspect.

The touch display panel provided by the present disclosure includes a display area and a non-display area around the display area. The non-display area includes a plurality of pressure sensors. When a touch body (e.g., a finger) touches the touch display panel, the plurality of pressure sensors in the touch display panel can detect a value of the pressure applied to the touch display panel by the touch body. At least one of the plurality of pressure sensors is configured a distance of H away from the closest corner of the touch display panel, where H satisfies 2.5 mm<H<42.5 mm, to improve the pressure detection condition of the touch display panel.

BRIEF DESCRIPTION OF DRAWINGS

FIG. 1b is a simulation diagram showing a relationship between the position of the pressure sensor unit along a dashed line as illustrated in FIG. 1a and a detection value of the pressure sensor unit when a corner at a position indicated by a dotted line on the touch display panel is pressed as illustrated in FIG. 1a.

FIG. 2b is a simulation diagram showing a relationship between the position of the pressure sensor unit along a dashed line as illustrated in FIG. 2a and a detection value of the pressure sensor unit when a corner at a position indicated by a dotted line on the touch display panel is pressed as illustrated in FIG. 2a.

FIG. 3b is a schematic structural diagram of a pressure sensor unit at a dashed line illustrated in FIG. 3a.

FIG. 3c is a schematic diagram showing a distribution of pressure sensor detection values obtained via a simulation when a corner at a position indicated by a dotted line on the touch display panel is pressed as illustrated in FIG. 3a and the pressure sensor unit is moved along the dashed line as illustrated in FIG. 3a.

FIG. 4b is an equivalent circuit diagram of the pressure sensor unit illustrated in FIG. 4a.

FIG. 7b is a schematic sectional view taken along a dotted line A1-A2 illustrated in FIG. 7a.

FIG. 8b is a schematic sectional view taken along a dotted line B1-B2 illustrated in FIG. 8a.

FIG. 9b is a schematic sectional view taken along a dotted line C1-C2 illustrated in FIG. 9a.

DETAILED DESCRIPTION

The present disclosure will be further described in detail with reference to the accompanying drawings and embodiments. It is to be understood that the embodiments set forth below are intended to explain and not to limit the present disclosure. For ease of description, only a part related to the present disclosure rather than the whole structure is illustrated in the accompanying drawings.

Figure 1A:
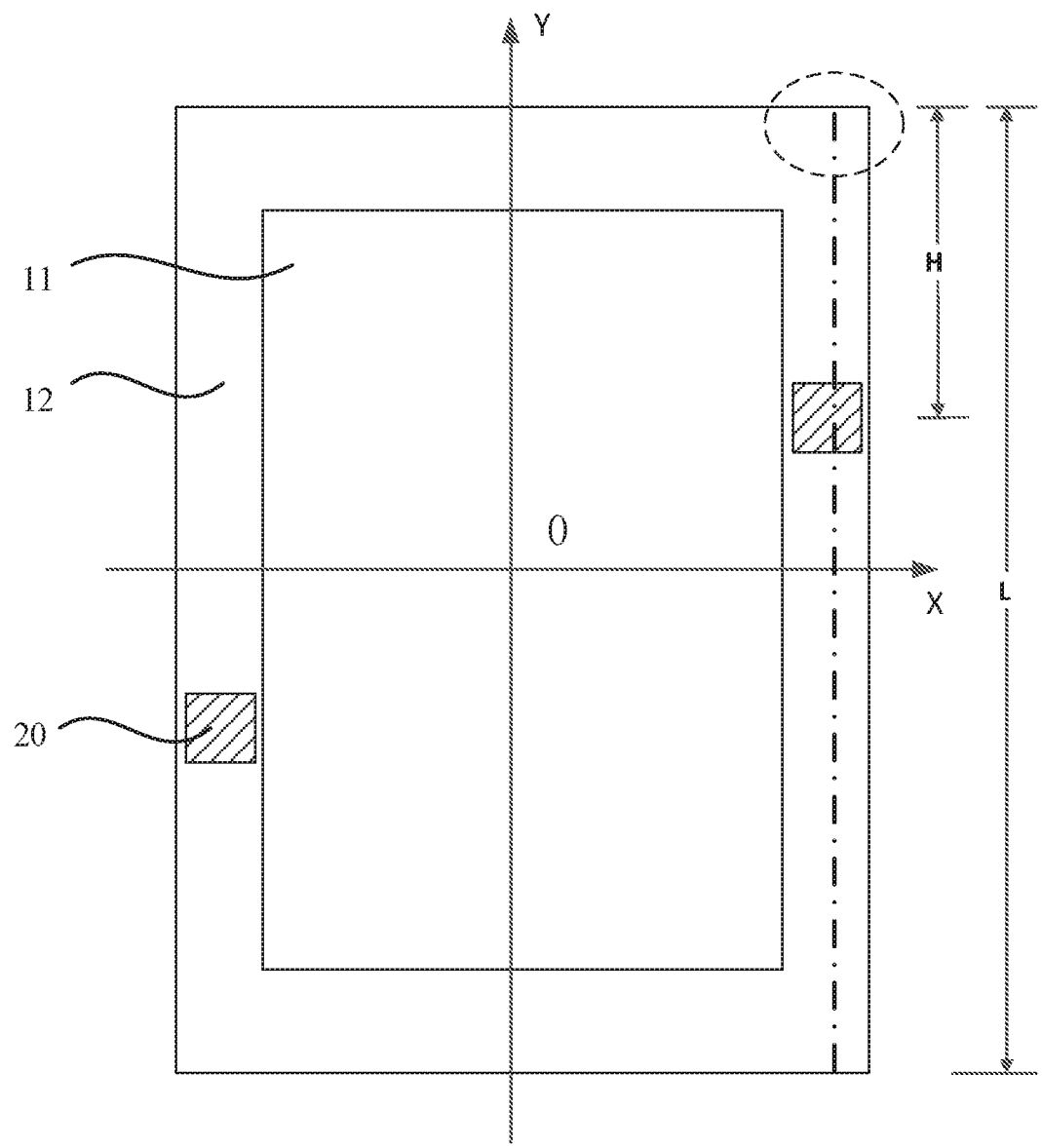
FIG. 1a is a top view of one touch display panel according to an embodiment of the present disclosure.
Figure 1B:
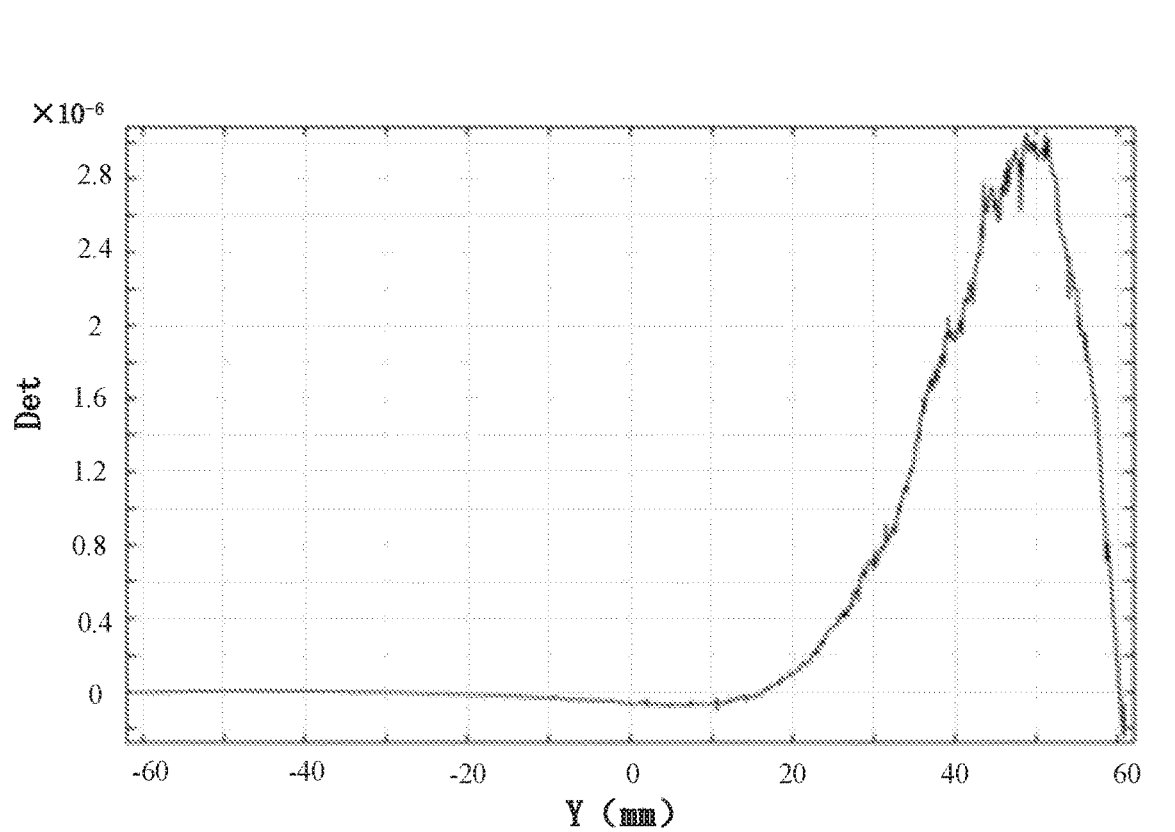

FIG. 1a is a top view of a touch display panel according to an embodiment of the present disclosure. FIG. 1b is a simulation diagram showing a relationship between the position of the pressure sensor unit along a dashed line as illustrated in FIG. 1a and a detection value of the pressure sensor unit when a corner at a position indicated by a dotted line on the touch display panel is pressed as illustrated in FIG. 1a. As illustrated in FIGS. 1a and 1b, the touch display panel includes a display area 11 and a non-display area 12 around the display area 11. The non-display area 12 includes a plurality of pressure sensors 20. Exemplarily, in FIG. 1a, the non-display area of the touch display panel includes two pressure sensors. It is to be understood that in other implementation modes, the non-display area of the touch display panel may include more than two pressure sensors.

Referring to FIG. 1a, a shape of the touch display panel is a rectangle. A long side of the rectangle has a length L of 125 mm. A length of a short side of the rectangle is not limited as long as the length of the short side of the touch display panel is less than the length of the long side of the touch display panel. A center of the touch display panel is configured as an origin of a coordinate system. An X-axis is parallel to the short side of the touch display panel and a Y-axis is parallel to the long side of the touch display panel. The dashed line is located in the non-display area 12 where X>0. The dashed line is a track along which the pressure sensor unit is moved. That is, the pressure sensor unit is moved along the dashed line when a pressure value of a pressed point is tested. The dashed line is parallel to the Y-axis. A corner indicated by a dotted line on the touch display panel is selected as the pressed point. A Y-coordinate value of the pressed point is 56.5 mm and the pressure value of the pressed point is 100 g. 100 g is selected as the simulative pressure value because a finger presses the touch display panel with 100 g pressure on average.

Referring to FIG. 1b, a unit of the Y-axis is millimeter (mm). The Y-axis in FIG. 1b corresponds to the Y-axis in FIG. 1a. Each Y-axis value corresponds to one detection value Det of the pressure sensor unit. The detection value Det of the pressure sensor unit is a dimensionless value representing a value of a pressure signal that the pressure sensor can detect. According to the actual situation, a measurement limit of the pressure sensor may be set to $0.1 \times 10^{-6}$. In this case, when Y≤20 mm or Y≥60 mm applies, Det<$0.1 \times 10^{-6}$ applies and pressing at the corner of the touch display panel cannot be detected by the pressure sensor unit 20. When 20 mm<Y<60 mm, Det>$0.1 \times 10^{-6}$ and pressing at the corner of the touch display panel can be detected by the pressure sensor unit 20.

It should be noted that since a touch body (e.g., the finger) has a certain size, when the touch body touches and presses the touch display panel, a maximum position of the pressed point of the touch body is not strictly at the corner, but is a certain distance away from the corner. Therefore, the Y-coordinate value of the pressed point is set to 56.5 mm rather than 62.5 mm which is the Y-coordinate value of the corner at the position indicated by the dotted line. The pressure sensor unit 20 at the dashed line is located a distance of H away from a corner closest to the pressure sensor unit 20 in the touch display panel. That is, when a Y-coordinate value of the pressure sensor unit 20 at the dashed line is greater than zero, the distance between the pressure sensor unit 20 at the dashed line and the corner of the touch display panel is H. When 20 mm<Y<60 mm applies, pressing at the corner of the touch display panel can be detected by the pressure sensor unit 20. After requirements met by the coordinate value of the pressure sensor unit are converted to requirements met by the distance between the pressure sensor and the corner, when (62.5 mm−60 mm)<H<(62.5 mm−20 mm) applies, pressing at the corner of the touch display panel can be detected by the pressure sensor unit 20. Thus, 2.5 mm<H<42.5 mm may be configured. It should be noted that the corner at the dotted line illustrated in FIG. 1a is exemplarily selected as the pressed point. A corner at another position may also be selected as the pressed point to reach a same conclusion.

Figure 2A:
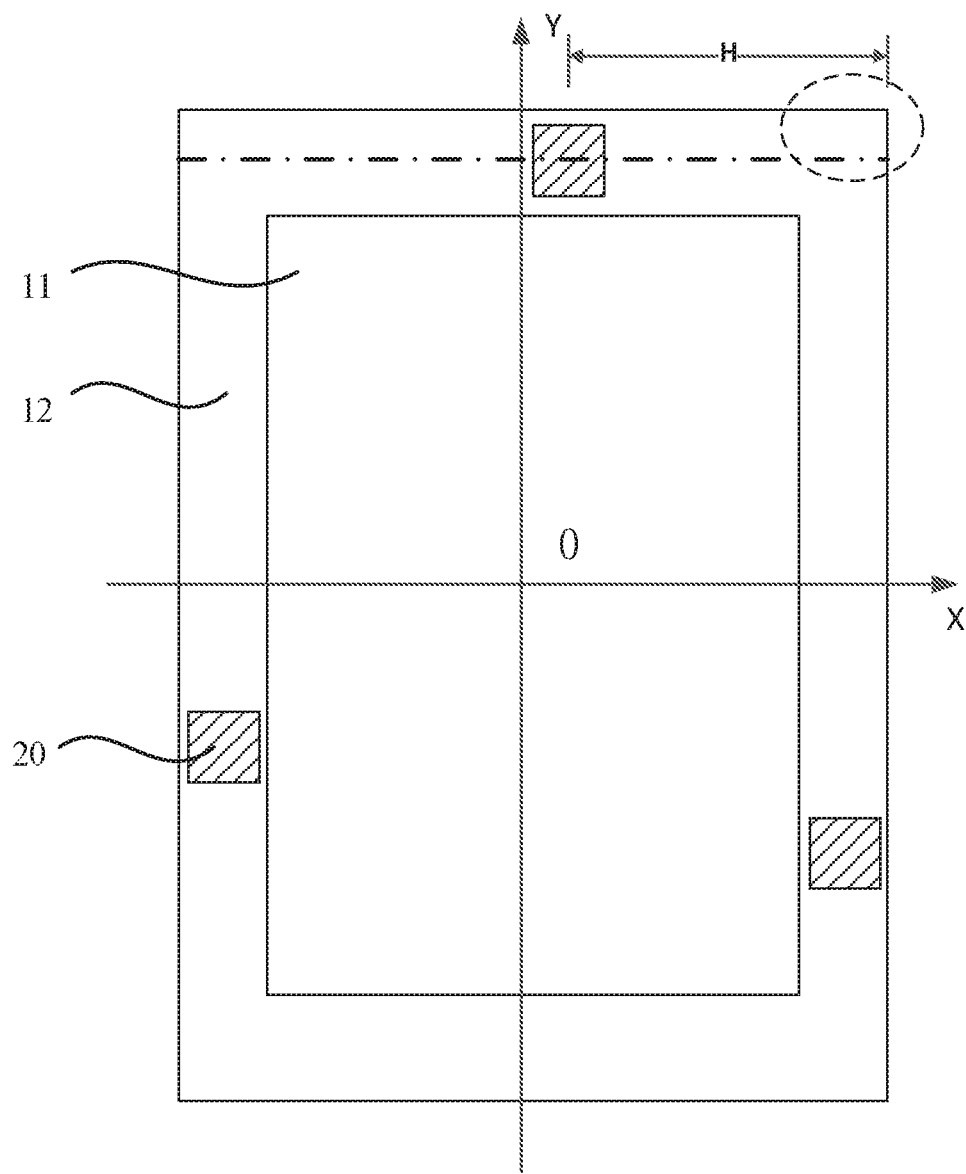
FIG. 2a is a top view of another touch display panel according to an embodiment of the present disclosure.
Figure 2B:
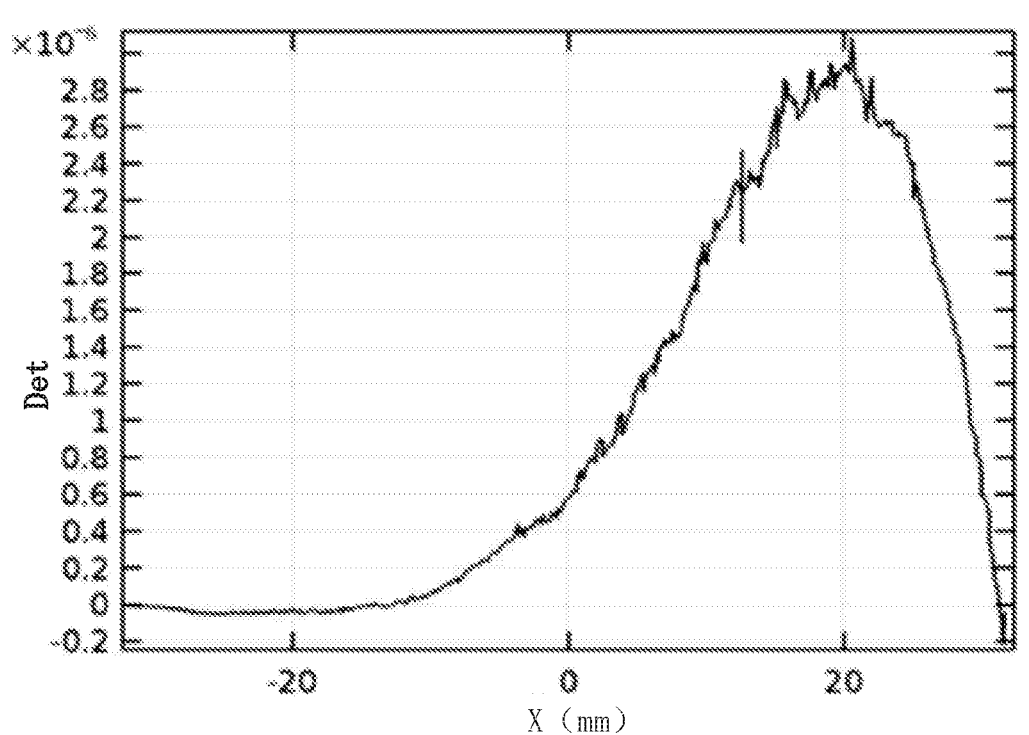

FIG. 2a is a top view of another touch display panel according to an embodiment of the present disclosure. FIG. 2b is a simulation diagram showing a relationship between the position of the pressure sensor unit along a dashed line as illustrated in FIG. 2a and a detection value of the pressure sensor unit when a corner at a position indicated by a dotted line on the touch display panel is pressed as illustrated in FIG. 2a. Referring to FIGS. 2a and 2b, a non-display area of the touch display panel exemplarily includes three pressure sensor units 20 in FIG. 2a. The touch display panel is a rectangular touch display panel. A short side of the rectangle has a length of 65 mm. A length of a long side of the rectangle is not limited as long as the length of the short side of the touch display panel is less than the length of the long side of the touch display panel. A center of the touch display panel is set as an origin of a coordinate system. An X-axis is parallel to the short side of the touch display panel and a Y-axis is parallel to the long side of the touch display panel. The dashed line is located in the non-display area 12 where Y>0. The dashed line is parallel to the X-axis. A corner at a position indicated by a dotted line on the touch display panel is selected as a pressed point and the pressure value of the pressed point is 100 g. Similarities to FIGS. 1a and 1b will not be repeated here. According to the actual situation, a measurement limit of the pressure sensor unit may be set to $0.1 \times 10^{-6}$. In this case, when X≤−10 mm or X≥30 mm applies, Det<$0.1 \times 10^{-6}$ applies and pressing at the corner of the touch display panel cannot be detected by the pressure sensor unit 20. When −10 mm<X<30 mm applies, Det≥$0.1 \times 10^{-6}$ applies and pressing at the corner of the touch display panel can be detected by the pressure sensor unit 20. The pressure sensor unit 20 at the dashed line is located a distance of H away from a corner closest to the pressure sensor unit 20 in the touch display panel. An X-coordinate value of the corner at the dotted line is 32.5 mm. When −10 mm<X<30 mm applies, pressing at the corner of the touch display panel can be detected by the pressure sensor unit 20, so when (32.5 mm−30 mm)<H<(32.5 mm−10 mm) applies, pressing at the corner of the touch display panel can be detected by the pressure sensor unit 20. The pressure sensor unit has a certain size and thus cannot completely coincide with the corner, so 2.5 mm<H<42.5 mm may be configured. It should be noted that the corner at the dotted line illustrated in FIG. 2a is exemplarily selected as the pressed point. A corner at another position may also be selected as the pressed point to reach a same conclusion.

The above is described in an example where the measurement limit of the pressure sensor unit is $0.1 \times 10^{-6}$. When the measurement limit of the pressure sensor unit is changed, the distance H between the pressure sensor and the corner closest to the pressure sensor unit in the touch display panel changes accordingly. It is to be understood that when a value of the measurement limit of the pressure sensor unit increases, a detection capability of the pressure sensor unit decreases and a value range of H decreases. In this case, the pressure value at the corner can be detected only when the pressure sensor unit is configured to be closer to the corner. When the value of the measurement limit of the pressure sensor unit decreases, the detection capability of the pressure sensor unit increases and the value range of H increases. In this case, the pressure value at the corner can be detected even when the pressure sensor unit is configured to be farther from the corner. For example, when the measurement limit of the pressure sensor unit is $0.5×10^{-6}$, for the touch display panel in FIGS. 1a and 1b, all parameters except the measurement limit of the pressure sensor unit are the same. In this case, when Y≤28 mm or Y≥59 mm applies, Det<0.5× $10^{-6}$ applies and pressing at the corner of the touch display panel cannot be detected by the pressure sensor unit 20. When 28 mm<Y<59 mm, Det≥0.5×$10^{-6}$ and pressing at the corner of the touch display panel can be detected by the pressure sensor unit 20. Thus, H satisfies: (62.5 mm−59 mm)<H<(62.5 mm−28 mm). That is, H satisfies: 3.5 mm<H<34.5 mm.

It should be noted that the touch display panel illustrated in FIGS. 1a and 1b are described in an example where the long side of the touch display panel is 125 mm. In this example, the distance H between the pressure sensor unit at the long side of the touch display panel and the corner of the touch display panel satisfies: 3.5 mm<H<34.5 mm. The touch display panel illustrated in FIGS. 2a and 2b are described in an example where the short side of the touch display panel is 65 mm. In this example, the distance H between the pressure sensor unit at the short side of the touch display panel and the corner of the touch display panel also satisfies: 3.5 mm<H<34.5 mm. It is to be understood that regardless of the side length of the touch display panel, 3.5 mm<H<34.5 mm can be configured for both the long side and the short side of the touch display panel so that the pressure value at the corner of the touch display panel can be detected.

The touch display panel provided by the embodiment of the present disclosure includes a display area and a non-display area around the display area. The non-display area includes a plurality of pressure sensor units. When a touch body (e.g., a finger) touches the touch display panel, the pressure sensor units in the touch display panel can detect values of pressure applied to the touch display panel by the touch body. At least one pressure sensor unit is configured a distance of H away from the closest corner of the touch display panel, where H satisfies 2.5 mm<H<42.5 mm, to improve a pressure detection condition of the touch display panel.

In one embodiment, referring to FIGS. 1a and 1b, the length of the long side of the rectangular touch display panel is L and at least one pressure sensor unit 20 is located along the long side of the rectangular touch display panel. When H=42.5 mm and L=125 mm apply, H/L=0.34 applies. When H=2.5 mm and L=125 mm apply, H/L=0.02 applies. H satisfies: 2.5 mm<H<42.5 mm, so H and L satisfy 0.02<H/L<0.34. 0.02<H/L<0.34 also applies when L>125 mm applies, i.e., when the length of the long side of the touch display panel is greater than 125 mm.

Figure 3A:
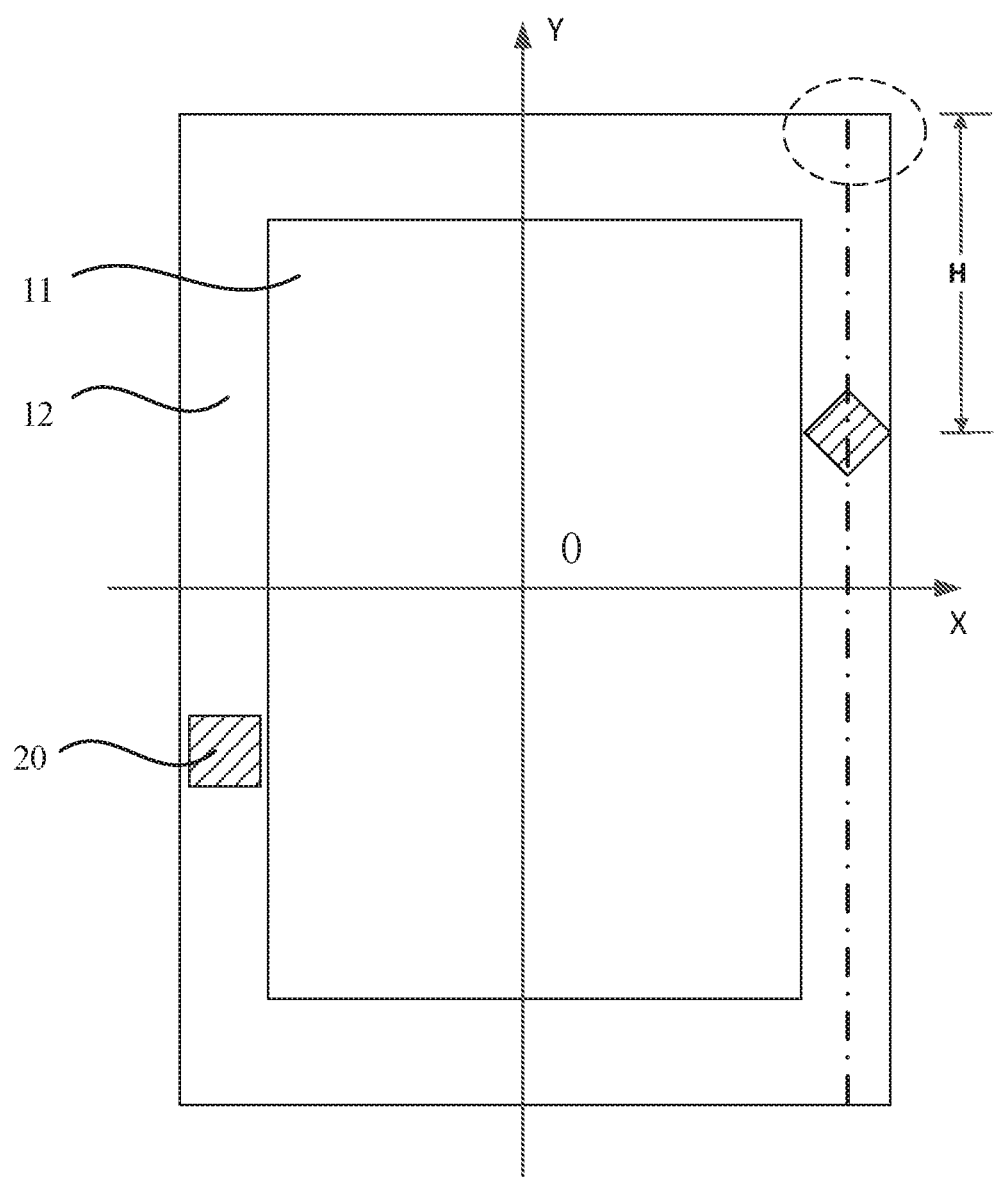
FIG. 3a is a top view of yet another touch display panel according to an embodiment of the present disclosure.
Figure 3B:
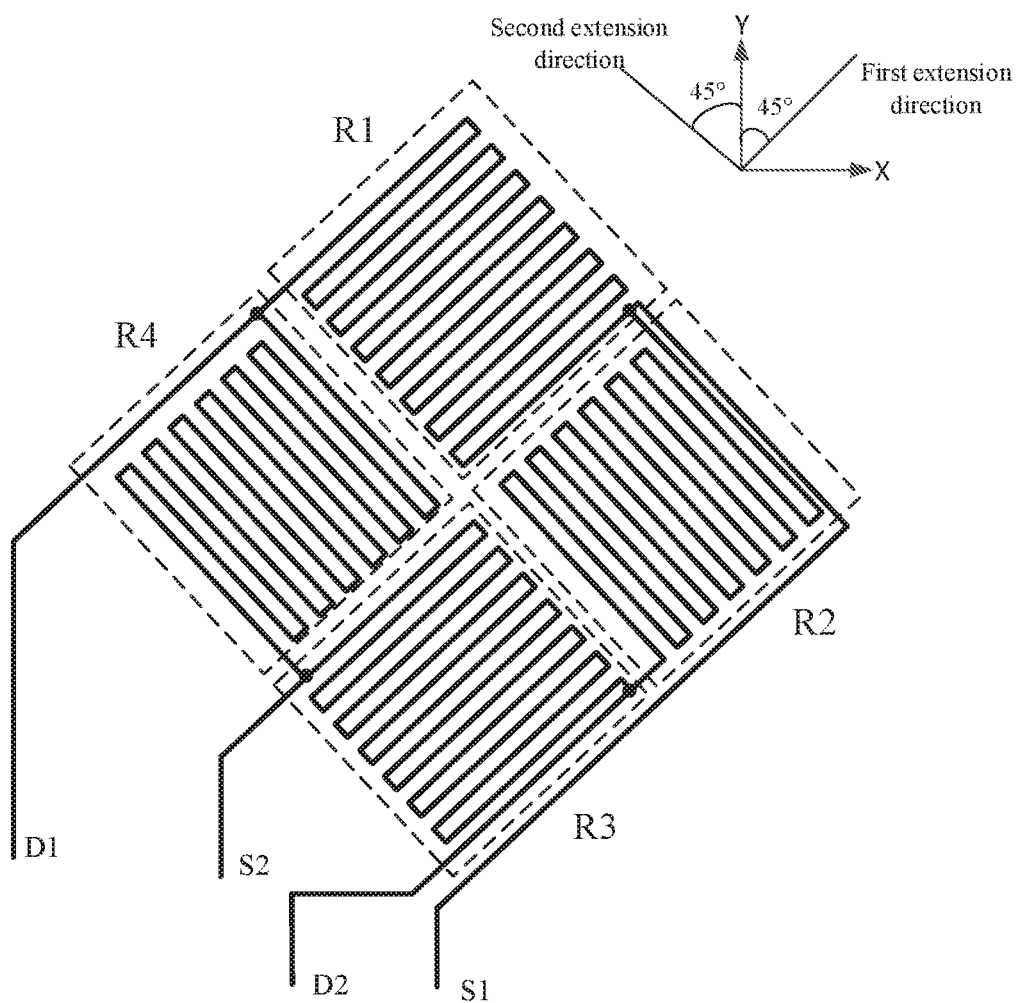
Figure 3C:
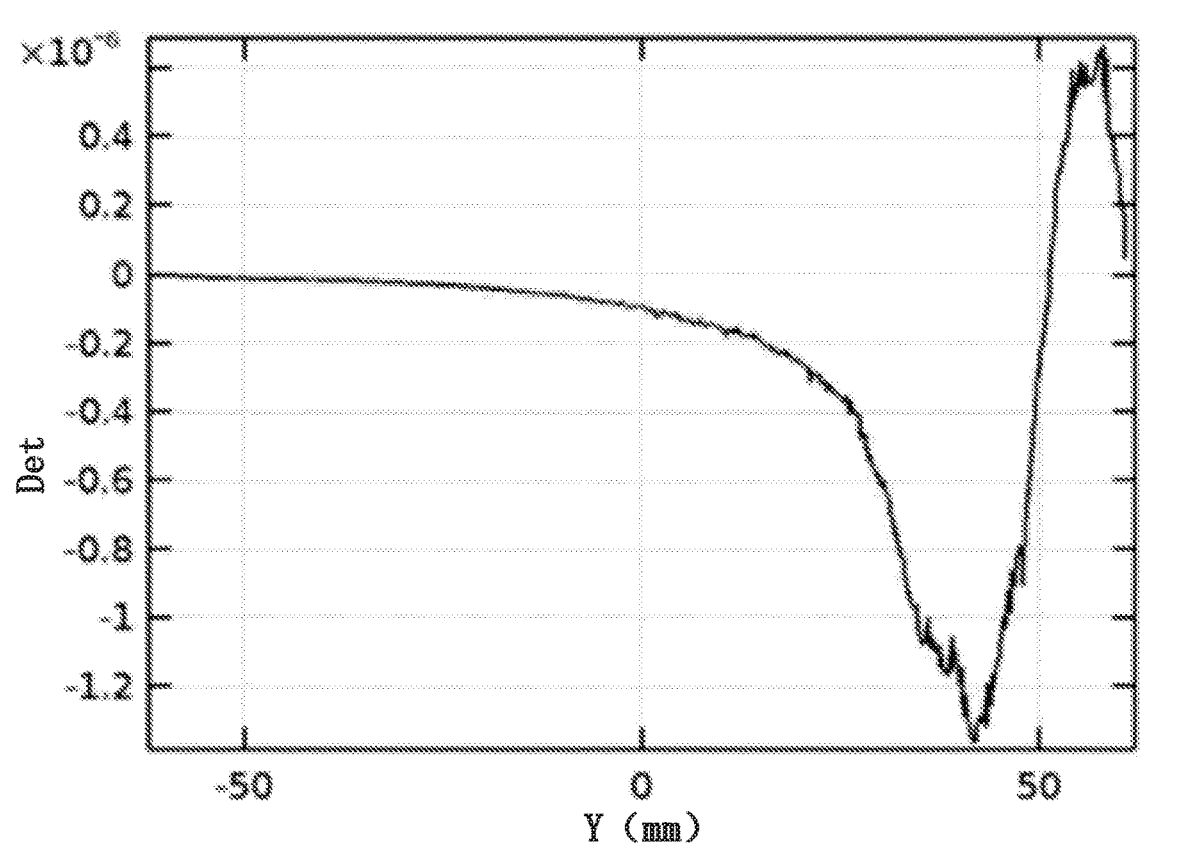

FIG. 3a is a top view of another touch display panel according to an embodiment of the present disclosure. FIG. 3b is a structural diagram of a pressure sensor unit at a dashed line illustrated in FIG. 3a. FIG. 3c is a schematic diagram showing a distribution of pressure sensor detection values obtained via a simulation when a corner indicated by a dotted line on the touch display panel is pressed as illustrated in FIG. 3a and the pressure sensor unit is moved along the dashed line as illustrated in FIG. 3a. Referring to FIGS. 3a, 3b and 3c, the touch display panel is a rectangle. A length of a long side of the rectangle is 125 mm. A length of a short side of the rectangle is not limited as long as the length of the short side of the touch display panel is less than the length of the long side of the touch display panel. The pressure sensor unit 20 is a bridge pressure sensor. The pressure sensor unit 20 includes a first resistor R1, a second resistor R2, a third resistor R3 and a fourth resistor R4. A first terminal of the first resistor R1 and a first terminal of the fourth resistor R4 are electrically connected to a first power input terminal D1, a second terminal of the first resistor R1 and a first terminal of the second resistor R2 are electrically connected to a first sensing signal measuring terminal 51, a second terminal of the fourth resistor R4 and a first terminal of the third resistor R3 are electrically connected to a second sensing signal measuring terminal S2, and a second terminal of the second resistor R2 and a second terminal of the third resistor R3 are electrically connected to a second power input terminal D2. The first resistor R1, the second resistor R2, the third resistor R3 and the fourth resistor R4 form a Wheatstone bridge. When a finger presses the touch display panel, the first resistor R1, the second resistor R2, the third resistor R3 and the fourth resistor R4 are deformed, thereby causing a voltage output value of the Wheatstone bridge to be changed. An operating voltage is applied to the Wheatstone bridge through the first power input terminal D1 and the second power input terminal D2, the voltage output value of the Wheatstone bridge is detected by the first sensing signal measuring terminal S1 and the second sensing signal measuring terminal S2, and then a pressure value is calculated from the voltage output value of the Wheatstone bridge.

In one embodiment, the touch display panel includes a first extension direction and a second extension direction. The first extension direction intersects the second extension direction. A component of an extension length from the first terminal to the second terminal of the first resistor R1 in the first extension direction is greater than that in the second extension direction. A component of an extension length from the first terminal to the second terminal of the second resistor R2 in the second extension direction is greater than that in the first extension direction. A component of an extension length from the first terminal to the second terminal of the third resistor R3 in the first extension direction is greater than that in the second extension direction. A component of an extension length from the first terminal to the second terminal of the fourth resistor R4 in the second extension direction is greater than that in the first extension direction. Such configurations allow the first resistor R1 and the third resistor R3 to sense strain in the first extension direction and allow the second resistor R2 and the fourth resistor R4 to sense strain in the second extension direction. The first resistor R1, the second resistor R2, the third resistor R3 and the fourth resistor R4 are collectively distributed in one region and thus have a synchronous temperature change, thereby eliminating an impact of temperature on the pressure sensor.

Referring to FIG. 3b, the first resistor R1, the second resistor R2, the third resistor R3 and the fourth resistor R4 are polyline-shaped. Using the first resistor R1 as an example, the polyline of the first resistor R1 includes long sides in the first extension direction and short sides in the second extension direction. Thus, the first resistor R1 can be deformed better in the first extension direction. Similarly, the third resistor R3 can also be deformed better in the first extension direction, and the second resistor R2 and the fourth resistor R4 can be deformed better in the second extension direction. The resistance value of first resistor R1, the resistance value of the second resistor R2, the resistance value of the third resistor R3 and the resistance value of the fourth resistor R4 are changed according to their respective deformation amounts. Therefore, a pressure value of a pressed point can be calculated based on a voltage variation converted from a difference between a deformation amount of the pressure sensor unit in the first extension direction and a deformation amount of the pressure sensor unit in the second extension direction. The polyline-shaped structure, on the one hand, ensures the first resistor R1, the second resistor R2, the third resistor R3 and the fourth resistor R4 to have large reference resistance values, and decreases sizes of the resistors to allow the resistors to be distributed in a small region and further eliminates an impact of temperature; and, on the other hand, increases a contact area between the resistors and the substrate in contact with the resistors so that the resistors can sense the deformation of the substrate more accurately, thus increasing pressure sensing accuracy. The substrate in contact with the resistors may be an array substrate, a color filter substrate or a cover plate.

Furthermore, the first extension direction and the second extension direction are perpendicular to each other and each of the first extension direction and the second extension direction is disposed at 45° with respect to the long side of the rectangular touch display panel. That is, each of the first extension direction and the second extension direction is disposed at 45° with respect to the Y-axis. It is to be noted that since the pressed point is at the corner of the touch display panel, a difference between a deformation amount in the long side direction of the touch display panel and a deformation amount in the short side direction of the touch display panel reaches a maximum, i.e., a difference between a deformation amount in the X-axis direction and a deformation amount in the Y-axis direction reaches a maximum, and the difference between the deformation amount in the first extension direction of the touch display panel and the deformation amount in the second extension direction of the touch display panel reaches a minimum. In this case, when the first extension direction is disposed at 0° or 90° with respect to the long side direction of the rectangular touch display panel, the bridge pressure sensor unit has a strongest sensing capability for the corner at the dotted line illustrated in FIG. 3a; and when the first extension direction is disposed at 45° with respect to the long side direction of the rectangular touch display panel, the bridge pressure sensor unit has a weakest sensing capability for the corner at the dotted line illustrated in FIG. 3a. In this case, to detect a value of pressure applied to the corner at the dotted line, the bridge pressure sensor unit should be disposed closer to the corner.

FIG. 3c is a schematic diagram showing the distribution of pressure sensor detection values obtained via a simulation when a corner indicated by a dotted line in FIG. 3a on the touch display panel is pressed and the pressure sensor unit is moved along the dashed line as illustrated in FIG. 3a. The pressure sensor unit in FIG. 3c is the bridge pressure sensor unit illustrated in FIG. 3b. The first extension direction is disposed at 45° with respect to the rectangular touch display panel. 100 g is selected as the pressure value and a measurement limit of the bridge pressure sensor unit may be set to $0.1 \times 10^{-6}$. In this case, when $Y \leq 52$ mm or $Y \geq 60$ mm applies, $Det < 0.1 \times 10^{-6}$ applies and pressing at the corner of the touch display panel cannot be detected by the bridge pressure sensor. When 52 mm$<Y<$60 mm applies, $Det \geq 0.1 \times 10^{-6}$ applies and pressing at the corner of the touch display panel can be detected by the bridge pressure sensor. Therefore, when (62.5 mm−60 mm)$<H<$(62.5 mm−52 mm) applies, pressing at the corner of the touch display panel can be detected by the bridge pressure sensor unit, so 2.5 mm$<H<$10.5 mm may be configured. When 2.5 mm$<H<$10.5 mm applies, pressing at the corner of the touch display panel can be detected by the bridge pressure sensor unit regardless of how the bridge pressure sensor unit is disposed, i.e., regardless of how many degrees are between the first extension direction and the long side direction of the rectangular touch display panel.

In one embodiment, the first resistor R1, the second resistor R2, the third resistor R3 and the fourth resistor R4 are made from metal.

The pressure sensor unit may be made from metal or made from polysilicon or amorphous silicon. Polysilicon or amorphous silicon is made into a polygonal block structure and connecting terminals are formed at multiple sides of the polygon, and then the pressure may be detected in conjunction with an external power circuit and a voltage detection circuit.

Figure 4A:
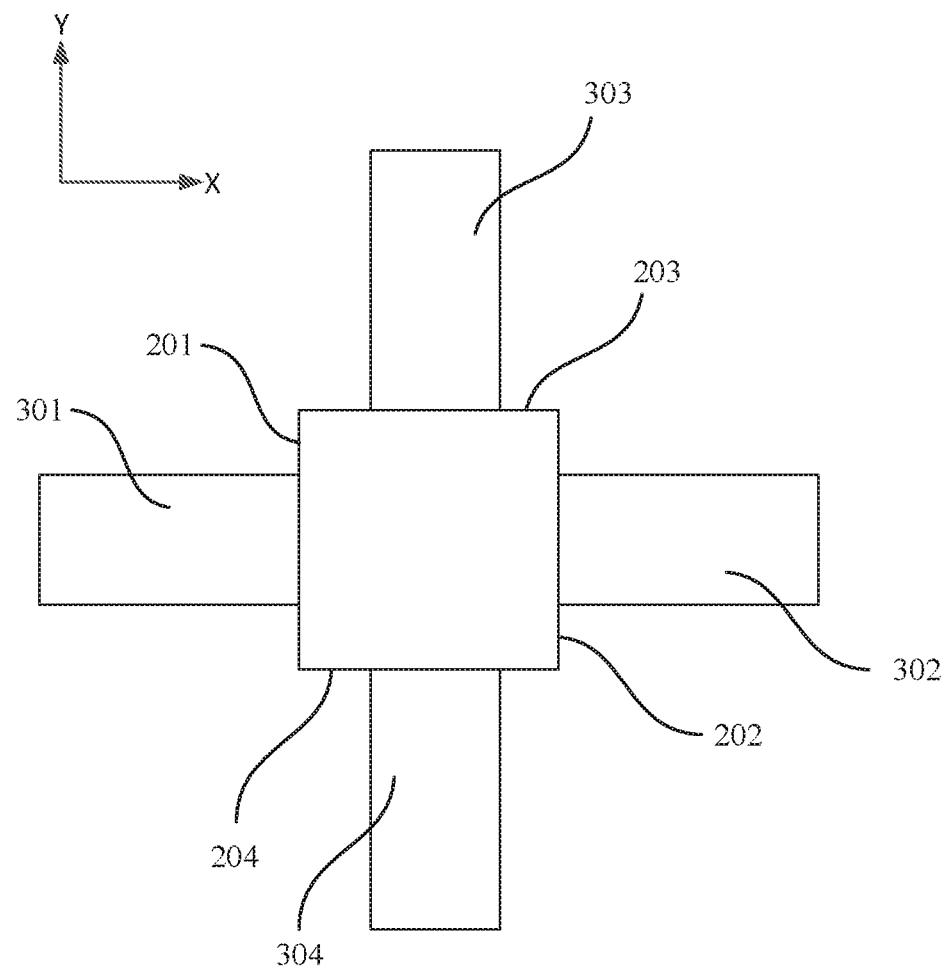
FIG. 4a is a structural diagram of another pressure sensor unit according to an embodiment of the present disclosure.

FIG. 4a is a structural diagram of another pressure sensor according to an embodiment of the present disclosure. As illustrated in FIG. 4a, the pressure sensor unit is a semiconductor pressure sensor unit. A shape of the semiconductor pressure sensor unit is a polygon including at least four sides, i.e., a first side 201, a second side 202, a third side 203 and a fourth side 204. At least one side is disposed between the first side 201 and the second side 202. At least one side is disposed between the third side 203 and the fourth side 204. The semiconductor pressure sensor unit includes a first power input terminal 301 at the first side 201 and a second power input terminal 302 at the second side 202 which are used for inputting a bias voltage signal to the semiconductor pressure sensor unit. The semiconductor pressure sensor unit further includes a first sensing signal measuring connecting terminal 303 at the third side 203 and a second sensing signal measuring connecting terminal 304 at the fourth side 204 which are used for outputting a pressure detection signal from the semiconductor pressure sensor unit.

Figure 4B:
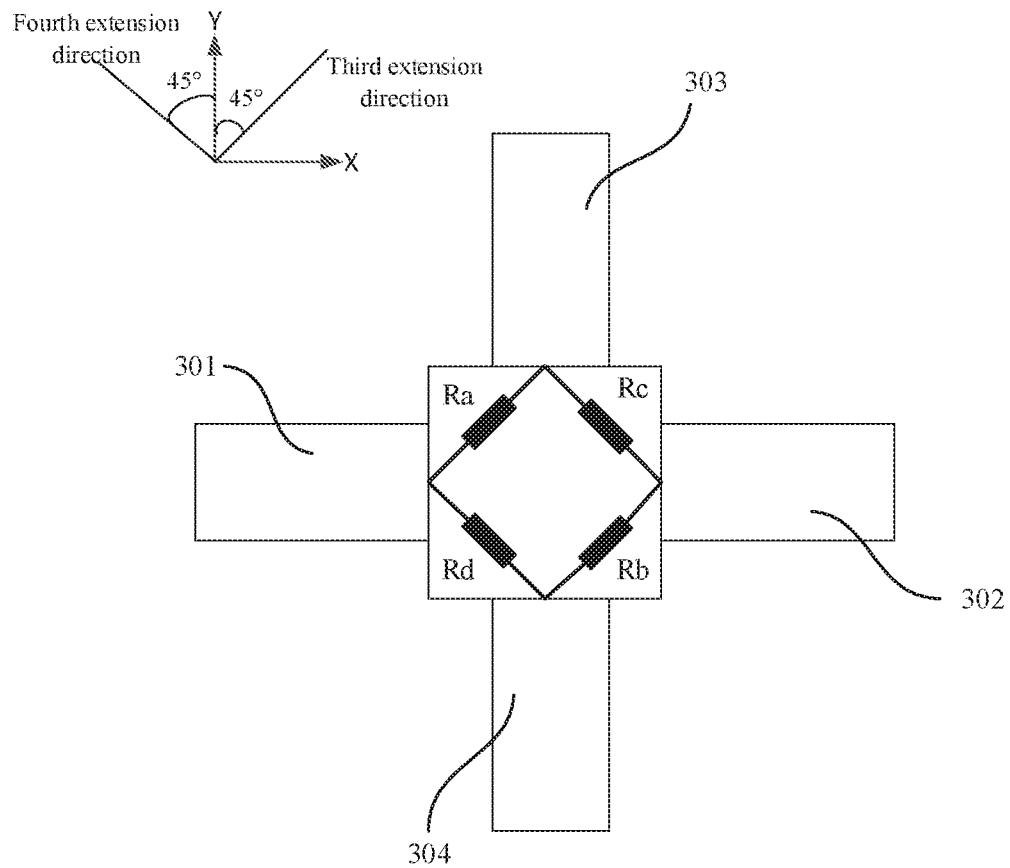

FIG. 4b is an equivalent circuit diagram of the pressure sensor unit illustrated in FIG. 4a. Referring to FIGS. 1a, 4a and 4b, the touch display panel is a rectangular touch display panel, and the shape of the semiconductor pressure sensor unit is a square. A semiconductor part (polysilicon or amorphous silicon) between the first power input terminal 301 and the first sensing signal measuring connecting terminal 303 is equivalent to a resistor Ra. A semiconductor part between the first sensing signal measuring connecting terminal 303 and the second power input terminal 302 is equivalent to a resistor Rc. A semiconductor part between the second power input terminal 302 and the second sensing signal measuring terminal 304 is equivalent to a resistor Rb. A semiconductor part between the second sensing signal measuring terminal 304 and the first power input terminal 301 is equivalent to a resistor Rd. The resistor Ra and the resistor Rb extend in a third extension direction and can be deformed in the third extension direction. The resistor Rc and the resistor Rd extend in a fourth extension direction and can be deformed in the fourth extension direction. Each of the third extension direction and the fourth extension direction is disposed at 45° with respect to the Y-axis. Since the pressed point is disposed at the corner of the touch display panel, a difference between a deformation amount in the long side direction of the touch display panel and a deformation amount in the short side direction of the touch display panel reaches a maximum, i.e., a difference between a deformation amount in the X-axis direction and a deformation amount in the Y-axis direction reaches a maximum, and a difference between a deformation amount in the third extension direction of the touch display panel and a deformation amount in the fourth extension direction of the touch display panel reaches a minimum. In this case, the first side 201 is disposed at 0° with respect to the long side of the rectangular touch display panel. That is, the first side 201 and the second side 202 extend in the Y-axis direction. In this case, the semiconductor pressure sensor unit has a weakest sensing capability for the corner at the dotted line illustrated in FIG. 1a. To detect a value of pressure applied to the corner at the dotted line, the semiconductor pressure sensor unit should be disposed closer to the corner. 100 g is selected as the pressure value and a measurement limit of the semiconductor pressure sensor unit may be set to $0.1 \times 10^{-6}$. H satisfies: 2.5 mm<H<10.5 mm. When 2.5 mm<H<10.5 mm applies, pressing at the corner of the touch display panel can be detected by the semiconductor pressure sensor unit regardless of how the semiconductor pressure sensor unit is disposed, i.e., regardless of how many degrees is the angle between the first side 201 and the long side direction of the rectangular touch display panel. It is to be understood that when 2.5 mm<H<10.5 mm applies, regardless of the type of the pressure sensor, either the bridge pressure sensor unit or the semiconductor pressure sensor unit, which is configured at any angle, can sense the pressure value at the corner closest to the pressure sensor.

Figure 5:
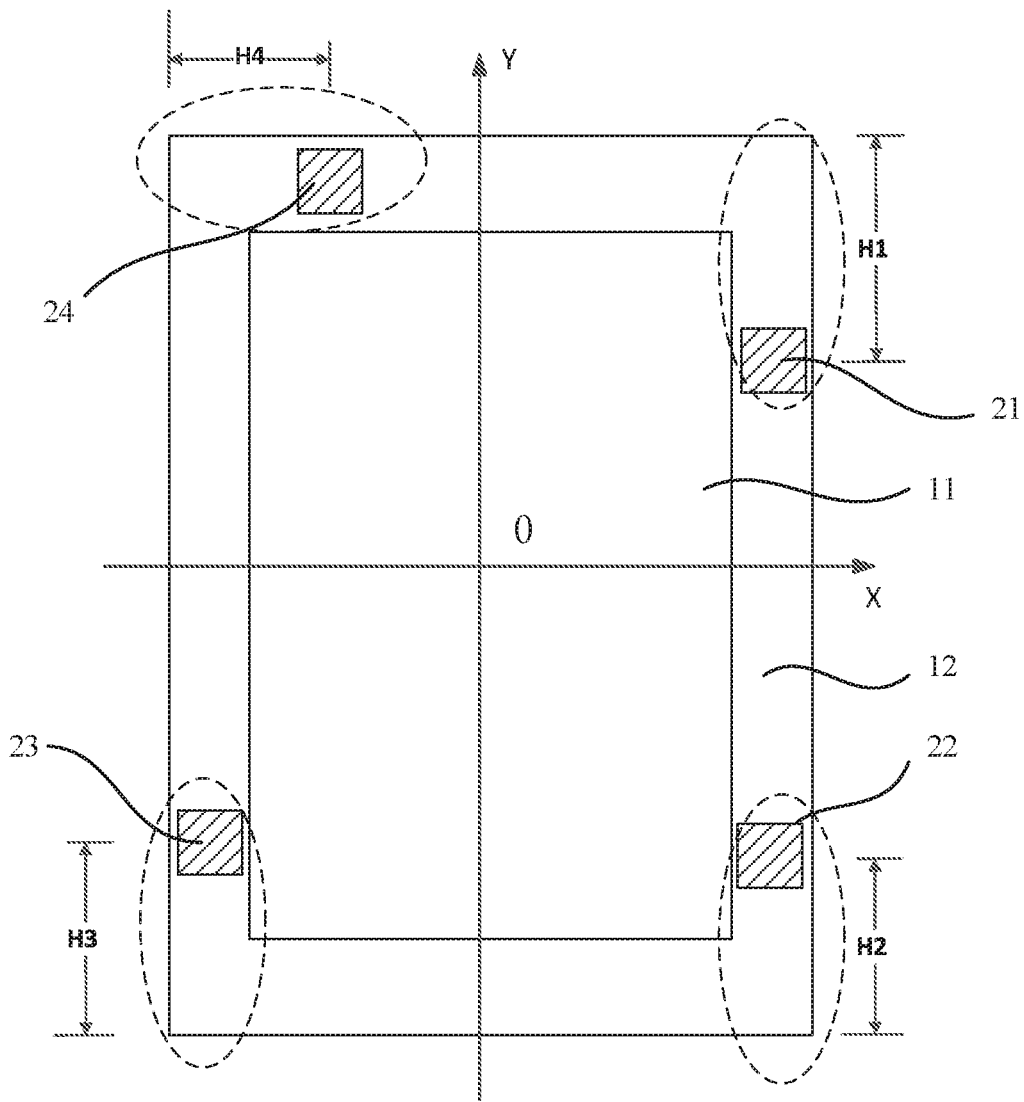
FIG. 5 is a top view of another touch display panel according to an embodiment of the present disclosure.

FIG. 5 is a top view of another touch display panel according to an embodiment of the present disclosure. As illustrated in FIG. 5, a non-display area 12 of the touch display panel includes a first pressure sensor unit 21, a second pressure sensor unit 22, a third pressure sensor unit 23 and a fourth pressure sensor unit 24. The first pressure sensor unit 21 is located a distance of H1 away from a first corner (i.e., a corner in a same dotted box as the first pressure sensor unit 21), which is closest to the first pressure sensor unit 21, of the rectangular touch display panel. The second pressure sensor unit 22 is located a distance of H2 away from a second corner (i.e., a corner in a same dotted box as the second pressure sensor unit 22), which is closest to the second pressure sensor unit 22, of the rectangular touch display panel. The third pressure sensor unit 23 is located a distance of H3 away from a third corner (i.e., a corner in a same dotted box as the third pressure sensor unit 23), which is closest to the third pressure sensor unit 23, of the rectangular touch display panel. The fourth pressure sensor unit 24 is located a distance of H4 away from a fourth corner (i.e., a corner in a same dotted box as the fourth pressure sensor unit 24), which is closest to the fourth pressure sensor unit 24, of the rectangular touch display panel. In addition, H1, H2, H3 and H4 satisfy: 2.5 mm<H1<42.5 mm, 2.5 mm<H2<42.5 mm, 2.5 mm<H3<42.5 mm and 2.5 mm<H4<42.5 mm. That is, each of four corners of the touch display panel is disposed with a corresponding pressure sensor unit so that pressure values at the corners can be detected, thereby avoiding pressure detection blind areas in the touch display panel and thus improving a pressure detection condition of the touch display panel. The pressure sensors may be disposed along a long side of the touch display panel or disposed along a short side of the touch display panel. This is not limited in the embodiment of the present disclosure.

Figure 6:
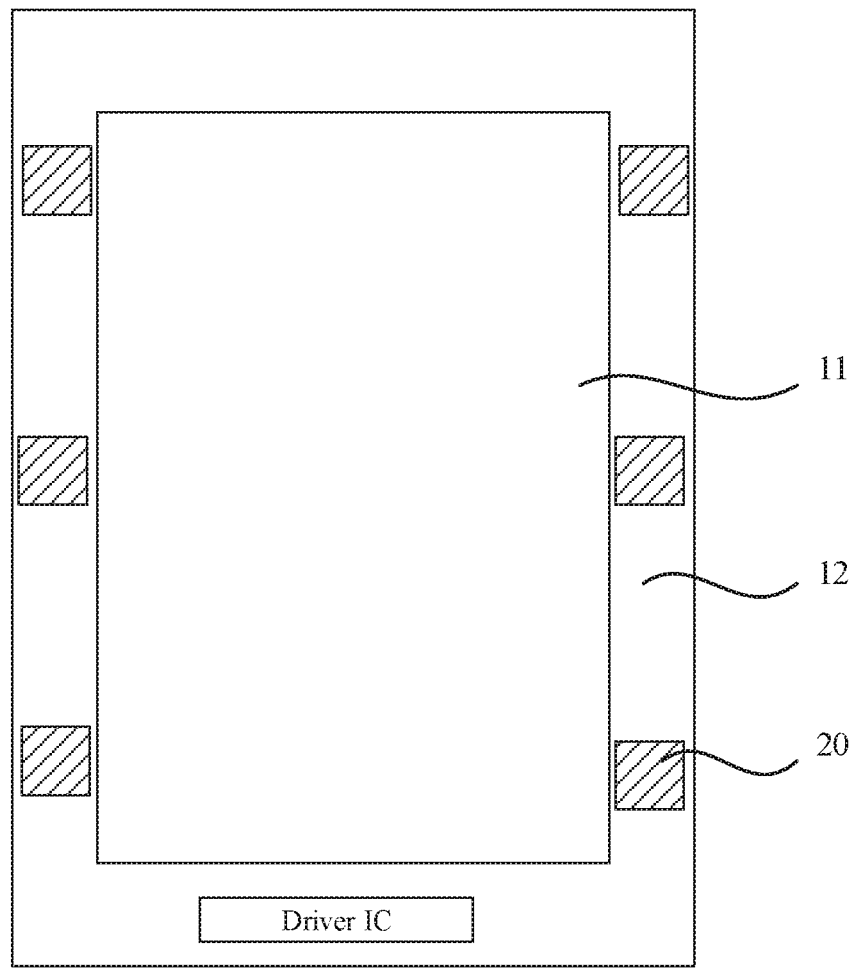
FIG. 6 is a top view of an additional touch display panel according to an embodiment of the present disclosure.

FIG. 6 is a top view of another touch display panel according to an embodiment of the present disclosure. As illustrated in FIG. 6, a plurality of pressure sensors units 20 are located along both long sides of the rectangular touch display panel. Drive circuits and signal processing circuits of pressure sensor units, a driver IC, a flexible circuit board and other structures are usually disposed along one short side of the touch display panel, so there is no sufficient space to accommodate the pressure sensor units. If the pressure sensor units are disposed along the other short side opposite to the driver IC, the flexible circuit board and other structures, then long connecting lines are may be necessary to connect the pressure sensor units to the drive circuits and the signal processing circuits of the pressure sensor units, and the connecting lines pass through both short sides of the touch display panel and one long side of the touch display panel, involving complex wiring. Therefore, the pressure sensor units may be disposed along both long sides of the touch display panel to achieve simplified wiring in addition to achieving the narrow bezel. Moreover, at least two pressure sensor units 20 may be disposed along each long side. In one embodiment, four pressure sensor units are located less than 42.5 mm away from respective four corners of the touch display panel to avoid pressure detection blind areas in the touch display panel. Furthermore, as illustrated in FIG. 6, the touch display panel includes six pressure sensor units. The six pressure sensor units are distributed substantially evenly along both long sides of the touch display panel. Therefore, the plurality of pressure sensor units can sense pressure evenly at all positions of the touch display panel, thereby facilitating a stronger pressure detection capability of the touch display panel as a whole. In one embodiment, a length of each side of each pressure sensor is set to greater than or equal to 20 nm, and less than or equal to 300 nm. Such configurations ensure that the pressure sensor units have appropriate resistance values and high pressure detection sensitivity without occupying too much space of the non-display area or affecting a display effect of the touch display panel.

In one embodiment, the touch display panel may be a liquid crystal display panel or an organic light-emitting display panel. If the touch display panel is a liquid crystal display panel, the liquid crystal display panel includes an array substrate and a color filter substrate, and pressure sensor units may be disposed on the array substrate or the color filter substrate. If the touch display panel is an organic light-emitting display panel, the organic light-emitting display panel includes an array substrate and a cover plate, and pressure sensor units may be disposed on the array substrate or the cover plate. Since the array substrate is typically provided with a circuit structure for driving liquid crystals (corresponding to the liquid crystal display panel) to rotate or driving a light-emitting layer (corresponding to the organic light-emitting display panel) to emit light, the pressure sensor units may be disposed on the array substrate. In such configurations, the pressure sensor units and signal lines connected to the pressure sensor units are formed while the circuit structure for driving the liquid crystals to rotate or driving the light-emitting layer to emit light is formed, thereby simplifying a manufacturing process. Additionally, part of the signal lines in the circuit structure for driving the liquid crystals to rotate or driving the light-emitting layer to emit light may be reused as signal lines electrically connected to the pressure sensor units to transmit bias voltage signals to the pressure sensor units or output pressure detection signals from the pressure sensor units, thereby reducing a wiring area of the signal lines connected to the pressure sensor units and relieving a wiring problem in the non-display area.

Figure 7A:
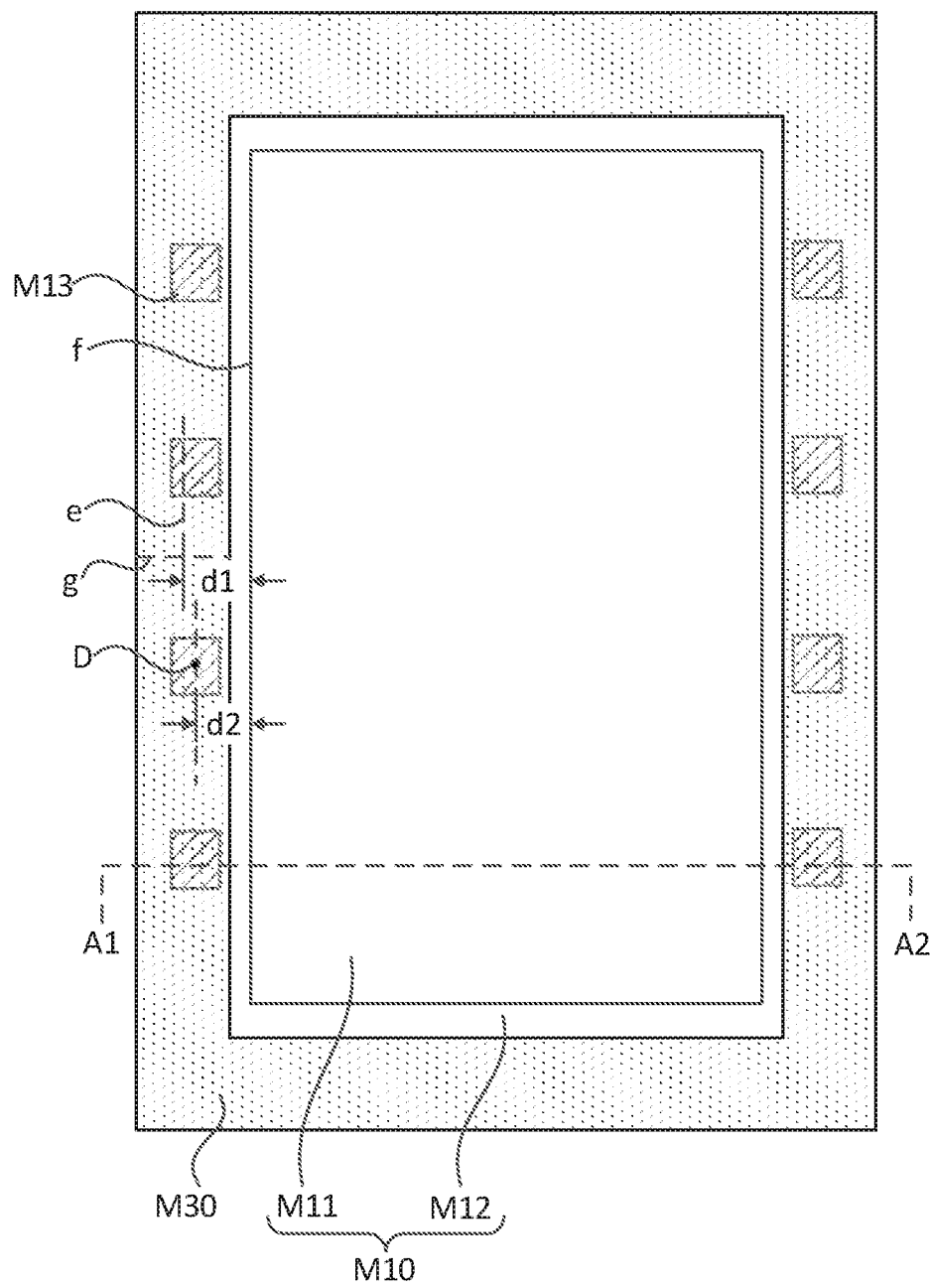
FIG. 7a is a schematic structural diagram of yet an additional touch display panel according to an embodiment of the present disclosure.
Figure 7B:
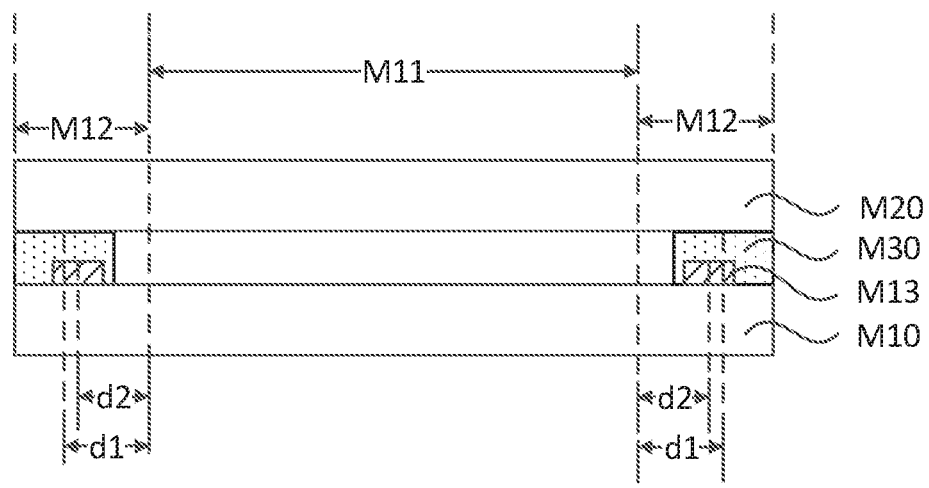

Based on the above-mentioned embodiments, the pressure detection performance of a touch display panel may be improved by arranging the positions of a sealant and the pressure sensor unit. FIG. 7a is a structural diagram of another touch display panel according to an embodiment of the present disclosure. FIG. 7b is a sectional view taken along a dotted line A1-A2 illustrated in FIG. 7a. Referring to FIGS. 7a and 7b, the touch display panel includes a first substrate M10 including a display area M11 and a non-display area M12 around the display area M11, a second substrate M20 opposite to the first substrate M10, and pressure sensor units M13 located on a side, facing towards the second substrate M20, of the first substrate M10. The pressure sensor units M13 are in the non-display area M12 of the first substrate M10. The first substrate M10 and the second substrate M20 are bonded by a sealant M30. An orthographic projection of the sealant M30 on the first substrate M10 is located in the non-display area M12 of the first substrate M10. A distance d1 from a centerline e of the sealant M30 to a boundary f between the display area M11 and the non-display area M12 is greater than a distance d2 from a geometric center D of the pressure sensor unit M13 to the boundary f between the display area M11 and the non-display area M12. The centerline e of the sealant M30 is a midperpendicular of a common perpendicular g of two edges of the sealant M30.

The first substrate M10 and the second substrate M20 forming the touch display panel are both deformed when a finger touches the touch display panel. Shear forces are generated at all positions on the first substrate M10 and the second substrate M20 after the deformation. The pressure sensor unit M13 is subjected to the shear force from a position (an orthographic projection of the pressure sensor unit M13 on the first substrate M10) corresponding to the pressure sensor unit M13 on the first substrate M10 and the shear force from a position (an orthographic projection of the pressure sensor unit M13 on the second substrate M20) corresponding to the pressure sensor unit M13 on the second substrate M20, so impedance of the internal sense resistance of the pressure sensor unit M13 is changed and accordingly a pressure detection signal outputted from the pressure sensor unit M13 is changed. A value of actual touch pressure inputted by a user can be obtained according to this pressure detection signal.

It has been found that since the first substrate M10 and the second substrate M20 are bonded to each other by the sealant M30, in an area where the sealant M30 is disposed, a binding force between the first substrate M10 and the second substrate M20 is stronger at a position closer to the centerline e of the sealant M30 and is weaker at a position closer to the edge of the sealant M30. Therefore, the closer the pressure sensor M13 is to the centerline e of the sealant M30, the weaker the shear force from the position corresponding to the pressure sensor unit M13 on the first substrate M10 and the shear force from the position corresponding to the pressure sensor unit M13 on the second substrate M20 during pressing. The farther the pressure sensor unit M13 is away from the centerline e of the sealant M30, the stronger the shear force from the position corresponding to the pressure sensor unit M13 on the first substrate M10 and the shear force from the position corresponding to the pressure sensor unit M13 on the second substrate M20 during pressing.

Through configurations in which the distance from the centerline of the sealant to the boundary between the display area and the non-display area is greater than the distance from the geometric center of the pressure sensor unit to the boundary between the display area and the non-display area, the embodiment of the present disclosure eliminates poor pressure detection performance caused by improper positional relationship between the sealant and the pressure sensor unit and improves pressure detection performance of the touch display panel.

Figure 8A:
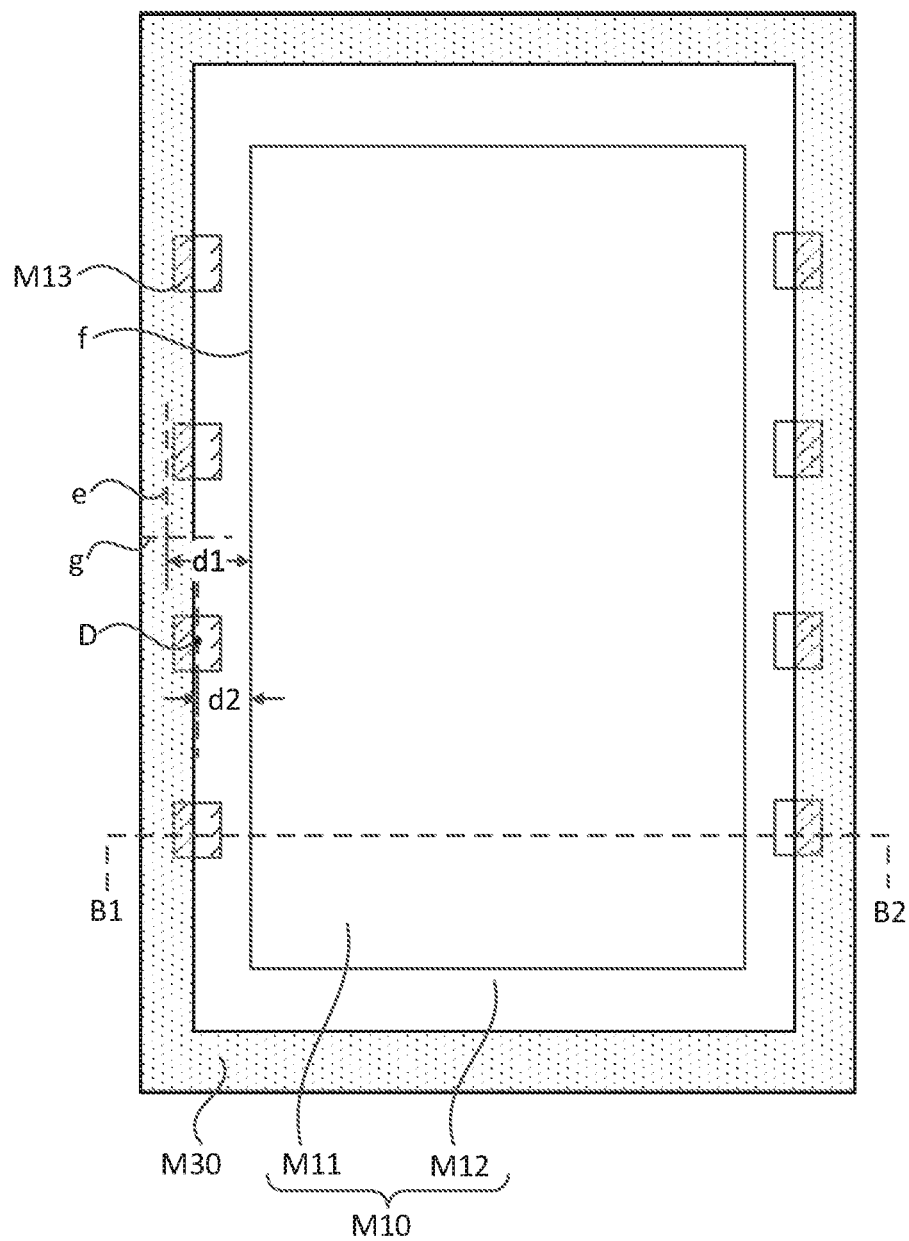
FIG. 8a is a schematic structural diagram of still an additional touch display panel according to an embodiment of the present disclosure.
Figure 8B:
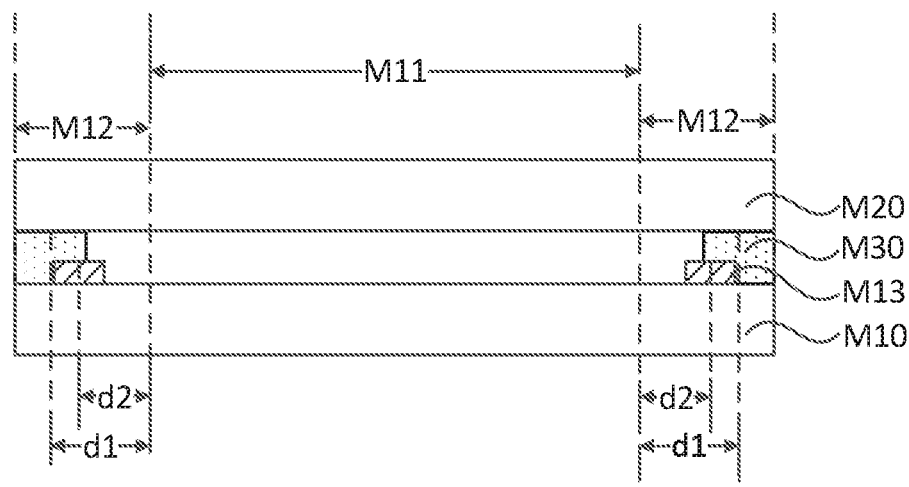

FIG. 8a is a structural diagram of another touch display panel according to an embodiment of the present disclosure. FIG. 8b is a sectional view taken along a dotted line B1-B2 illustrated in FIG. 8a. Referring to FIGS. 8a and 2b, an orthographic projection of the sealant M30 on the first substrate M10 may be configured to coincide with at least part of an orthographic projection of a pressure sensor unit M13 on the first substrate M10. That is, the sealant M30 covers at least part of the pressure sensor unit M13. In such configurations, the shear force from the position corresponding to the pressure sensor unit M13 on the first substrate M10 and the shear force from the position corresponding to the pressure sensor unit M13 on the second substrate M20 are strengthen during pressing so that the pressure detection signal outputted from the pressure sensor unit M13 is strengthen, pressure detection sensitivity is improved and thus pressure detection performance of the touch display panel is improved in a case where a constant bias voltage signal is inputted. Typically, an area of the pressure sensor unit M13 covered by the sealant M30 is configured to be less than or equal to half a total area of the pressure sensor unit M13 to ensure high pressure detection performance of the touch display panel.

Figure 9A:
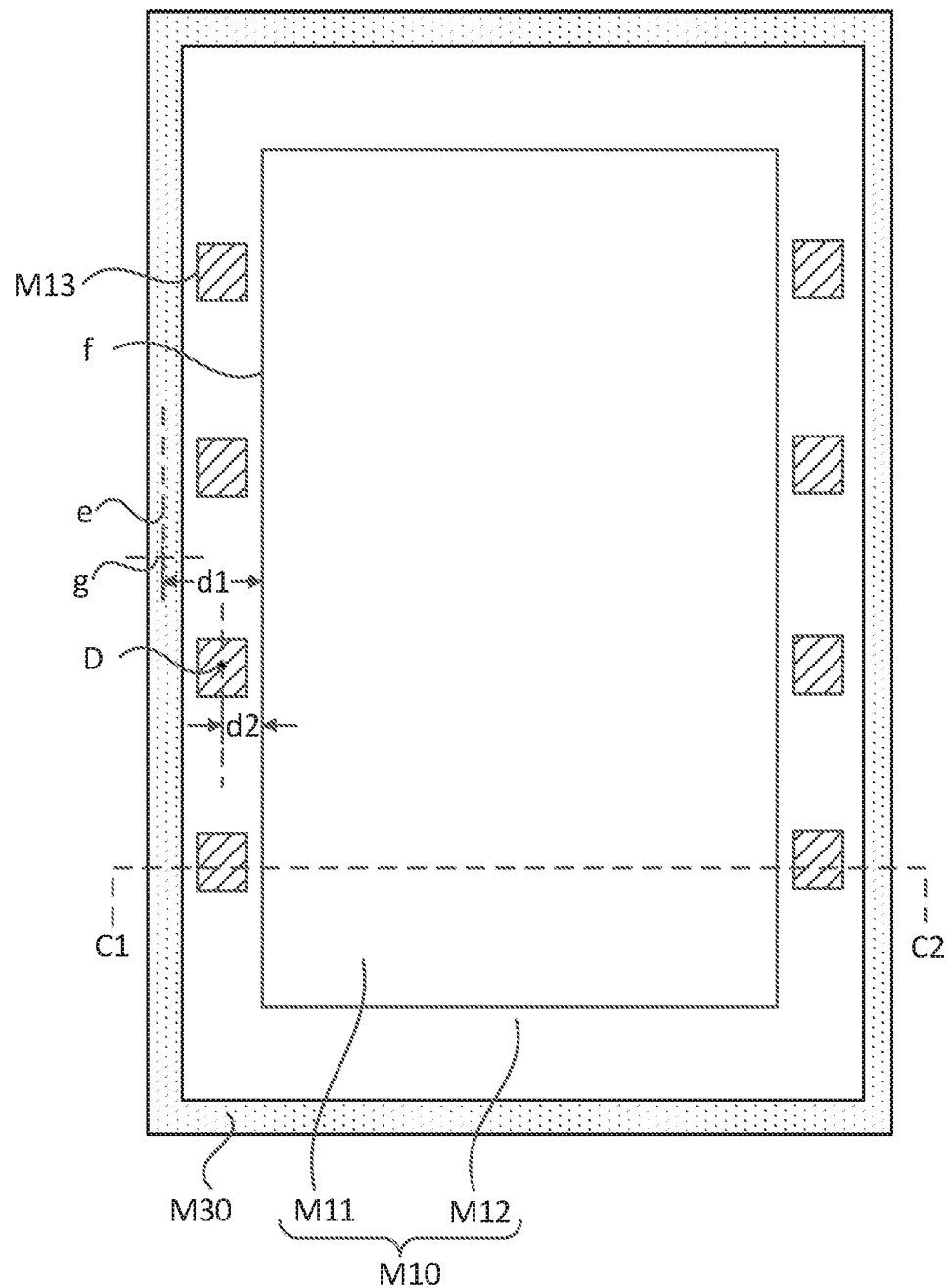
FIG. 9a is a schematic structural diagram of yet still another touch display panel according to an embodiment of the present disclosure.
Figure 9B:
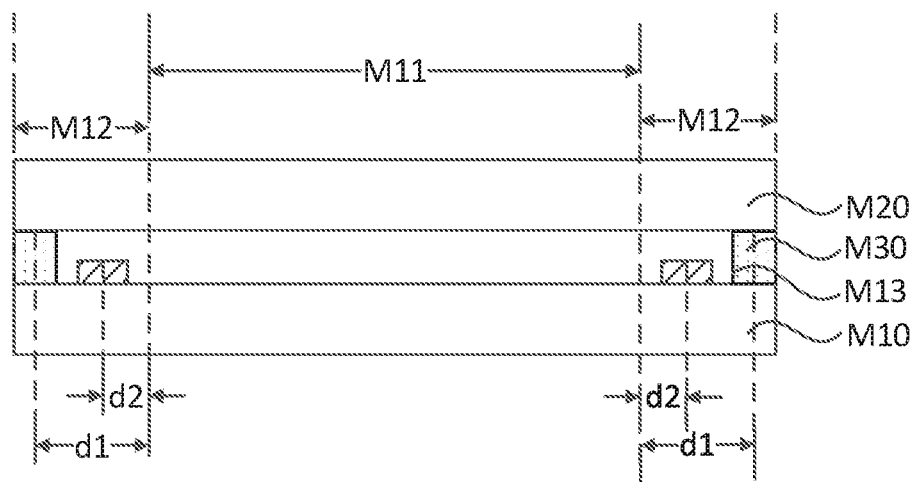

FIG. 9a is a structural diagram of another touch display panel according to an embodiment of the present disclosure. FIG. 9b is a sectional view taken along a dotted line C1-C2 illustrated in FIG. 9a. Referring to FIGS. 9a and 3b, an orthographic projection of the sealant M30 on the first substrate M10 may be configured to not coincide with an orthographic projection of the pressure sensor unit M13 on the first substrate M10. In such configurations, shear force from a position corresponding to the pressure sensor unit M13 on the first substrate M10 and shear force from a position corresponding to the pressure sensor unit M13 on a second substrate M20 are strengthen during pressing so that the pressure detection signal outputted from the pressure sensor unit M13 is strengthen, pressure detection sensitivity is improved and thus pressure detection performance of the touch display panel is improved in a case where a constant bias voltage signal is inputted.

Additionally, if the touch display panel is a liquid crystal display panel, the first substrate M10 may be an array substrate and the second substrate M20 may be a color filter substrate, or the first substrate M10 may be a color filter substrate and the second substrate M20 may be an array substrate. If the touch display panel is an organic light-emitting display (OLED) panel, the first substrate M10 may be an array substrate and the second substrate M20 may be a cover plate, or the first substrate M10 may be a cover plate and the second substrate M20 may be an array substrate.

Figure 10:
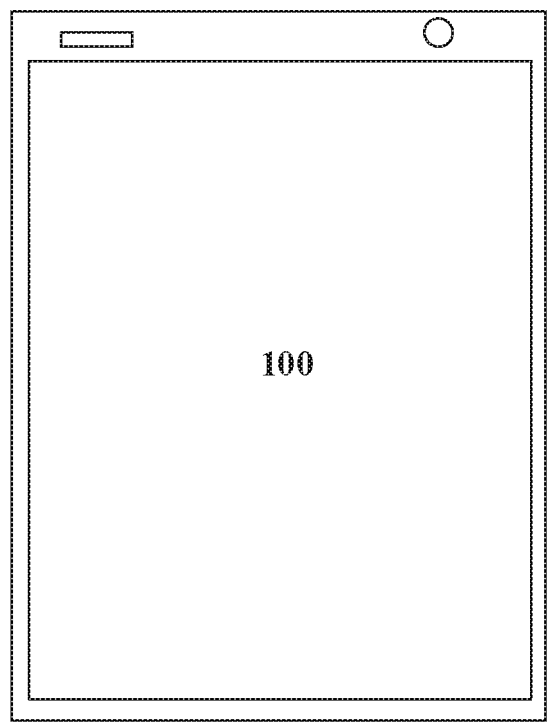
FIG. 10 is a schematic structural diagram of a display device according to an embodiment of the present disclosure.

An embodiment of the present disclosure further provides a display device. FIG. 10 is a structural diagram of a display device according to an embodiment of the present disclosure. As illustrated in FIG. 10, the display device provided by the embodiment of the present disclosure includes the touch display panel 100 described in any one of embodiments of the present disclosure. The display device may be a mobile phone as illustrated in FIG. 10, or a computer, a television, an intelligent wearing device, etc. This is not limited in the present embodiment.

It will be understood by those skilled in the art that the present disclosure is not limited to the embodiments described herein. Those skilled in the art can make various apparent modifications, adaptations, combinations and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A touch display panel, comprising:
a first substrate and a second substrate, wherein the second substrate is arranged opposite to the first substrate,
wherein the first substrate comprises a display area and a non-display area around the display area,
wherein each of a plurality of pressure sensors is located in the non-display area; and at least one of the plurality of pressure sensors is located a distance of H away from a corner of the touch display panel closest to the at least one of the plurality of pressure sensors, wherein H satisfies:
2.5 mm<H<42.5 mm,
wherein the first substrate and the second substrate are bonded to each other by a sealant,
wherein the plurality of pressure sensors are arranged on a surface of the first substrate facing the second substrate and each of the plurality of pressure sensors is partially coated by the sealant,
wherein a length of each edge of the plurality of pressure sensors is less than a length of each edge of the display area, and
wherein a distance from a centerline of the sealant to a boundary between the display area and the non-display area is greater than a distance from a geometric center of one of the plurality of pressure sensors to the boundary between the display area and the non-display area.

2. The touch display panel of claim 1, wherein the touch display panel is rectangular.

3. The touch display panel of claim 2, wherein a length of a long side of the rectangular touch display panel is L and the at least one of the plurality of pressure sensors is located along the long side of the rectangular touch display panel, wherein H and L satisfy:
0.02<H/L<0.34.

4. The touch display panel of claim 2, wherein the plurality of pressure sensors comprise a first pressure sensor, a second pressure sensor, a third pressure sensor and a fourth pressure sensor, wherein the first pressure sensor is located a distance of H1 away from a first corner, which is closest to the first pressure sensor, of the rectangular touch display panel,
the second pressure sensor is located a distance of H2 away from a second corner, which is closest to the second pressure sensor, of the rectangular touch display panel,
the third pressure sensor is located a distance of H3 away from a third corner, which is closest to the third pressure sensor, of the rectangular touch display panel, and
the fourth pressure sensor is located a distance of H4 away from a fourth corner, which is closest to the fourth pressure sensor, of the rectangular touch display panel, and wherein H1, H2, H3 and H4 satisfy: 2.5 mm<H1<42.5 mm, 2.5 mm<H2<42.5 mm, 2.5 mm<H3<42.5 mm and 2.5 mm<H4<42.5 mm.

5. The touch display panel of claim 2, wherein the plurality of pressure sensors are disposed along two long sides of the rectangular touch display panel and each long side is provided with at least two of the plurality of pressure sensors.

6. The touch display panel of claim 1, wherein the plurality of pressure sensors are made from polysilicon or amorphous silicon.

7. The touch display panel of claim 1, wherein the touch display panel is a liquid crystal display panel or an organic light-emitting display panel.

8. The touch display panel of claim 1, wherein one of the first substrate and the second substrate is an array substrate, and the other one of the first substrate and the second substrate is a color filter substrate.

9. The touch display panel of claim 1, wherein each of the plurality of pressure sensors comprises a first resistor, a second resistor, a third resistor and a fourth resistor, and
wherein a first terminal of the first resistor and a first terminal of the fourth resistor are electrically connected to a first power input terminal, a second terminal of the first resistor and a first terminal of the second resistor are electrically connected to a first sensing signal measuring terminal, a second terminal of the fourth resistor and a first terminal of the third resistor are electrically connected to a second sensing signal measuring terminal, and a second terminal of the second resistor and a second terminal of the third resistor are electrically connected to a second power input terminal.

10. The touch display panel of claim 9, wherein the first resistor comprises a plurality of longer sections extending in a first extension direction and a plurality of shorter sections extending in a second extension direction, the plurality of longer sections are alternately connected with the plurality of shorter sections, and the first extension direction and the second extension direction are perpendicular to each other,
wherein the second resistor comprises a plurality of longer sections extending in the second extension direction and a plurality of shorter sections extending in the first extension direction, the plurality of longer sections are alternately connected with the plurality of shorter sections,
wherein the third resistor comprises a plurality of longer sections extending in the first extension direction and a plurality of shorter sections extending in the second extension direction, the plurality of longer sections are alternately connected with the plurality of shorter sections, and
wherein the fourth resistor comprises a plurality of longer sections extending in the second extension direction and a plurality of shorter sections extending in the first extension direction, the plurality of longer sections are alternately connected with the plurality of shorter sections.

11. The touch display panel of claim 10, wherein the touch display panel is rectangular; and the second extension direction is disposed at 45° with respect to a long side of the rectangular touch display panel; and
H satisfies: 2.5 mm<H<10.5 mm.

12. The touch display panel of claim 9, wherein the first resistor, the second resistor, the third resistor and the fourth resistor are made from metal.

13. A display device, comprising:
a touch display panel,
wherein the touch display panel comprises: a first substrate, wherein the first substrate comprises a display area and a non-display area around the display area, each of a plurality of pressure sensors is located in the non-display area;

at least one of the plurality of pressure sensors is located a distance of H away from a corner of the touch display panel closest to the at least one of the plurality of pressure sensors; and H satisfies: 2.5 mm<H<42.5 mm, wherein the touch display panel further comprises a second substrate, wherein the second substrate is arranged opposite to the first substrate, wherein the first substrate and the second substrate are bonded to each other by a sealant, wherein the plurality of pressure sensors are arranged on a surface of the first substrate facing the second substrate and each of the plurality of pressure sensors is partially coated by the sealant, wherein a length of each edge of the plurality of pressure sensors is less than a length of each edge of the display area, and wherein a distance from a centerline of the sealant to a boundary between the display area and the non-display area is greater than a distance from a geometric center of one of the plurality of pressure sensors to the boundary between the display area and the non-display area.

14. A touch display panel, comprising:

a first substrate and a second substrate, wherein the second substrate is arranged opposite to the first substrate, wherein the first substrate comprises:

a display area and a non-display area around the display area; and a first pressure sensor, a second pressure sensor, a third pressure sensor, and a fourth pressure sensor, which are arranged in the non-display area, wherein the display area has a rectangle shape, the first pressure sensor and the second pressure sensor are located between the display area and a first longer out edge of the non-display area, the third pressure sensor is located between the display area and a second longer out edge of the non-display area, and the fourth pressure sensor is located between the display area and a shorter out edge, wherein the first substrate and the second substrate are bonded to each other by a sealant, wherein the first pressure sensor, the second pressure sensor, the third pressure sensor, and the fourth pressure sensor are arranged on a surface of the first substrate facing the second substrate, and each of the first pressure sensor, the second pressure sensor, the third pressure sensor, and the fourth pressure sensor is partially coated by the sealant, wherein a length of each edge of the first pressure sensor, the second pressure sensor, the third pressure sensor, and the fourth pressure sensor is less than a length of each edge of the display area, and wherein a distance from a centerline of the sealant to a boundary between the display area and the non-display area is greater than a distance from a geometric center of one of the plurality of pressure sensors to the boundary between the display area and the non-display area.

* * * * *